Feb. 4, 1964 P. J. VAN DER WALT 3,120,488
METHOD OF AND APPARATUS FOR SEPARATING SOLID MATERIALS
INTO FRACTIONS ACCORDING TO DENSITY
Filed March 10, 1961 2 Sheets-Sheet 1

Inventor
PETRUS J. VAN DER WALT
By
Mead, Browne, Schuyler + Beveridge, Attorneys Feb. 4, 1964                P. J. VAN DER WALT                3,120,488
          METHOD OF AND APPARATUS FOR SEPARATING SOLID MATERIALS
                    INTO FRACTIONS ACCORDING TO DENSITY
Filed March 10, 1961                                    2 Sheets-Sheet 2
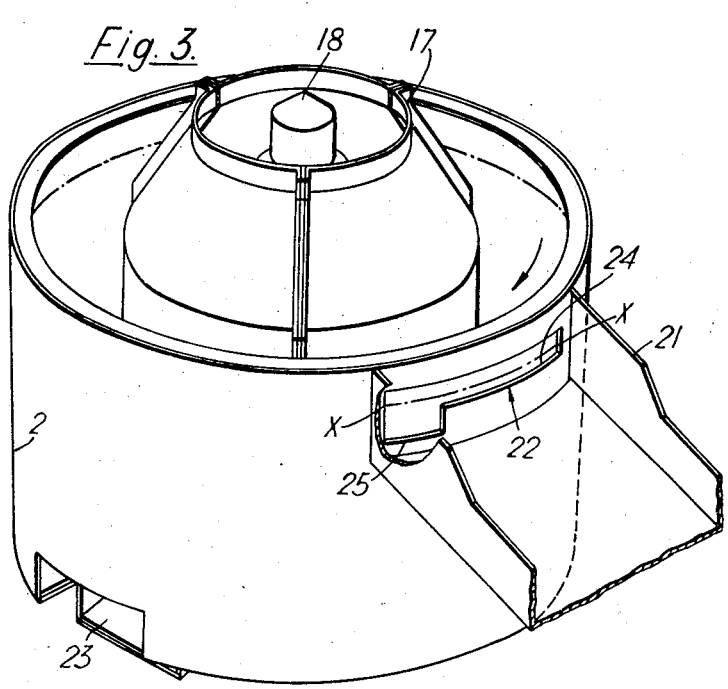
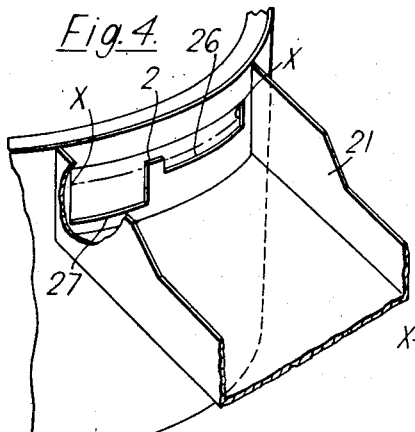
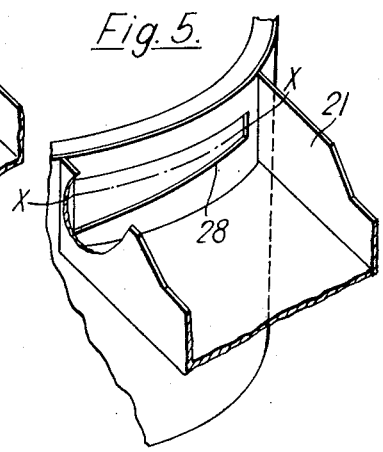
Inventor
PETRUS J. VAN DER WALT
By
Mead, Browne, Schuyler + Beveridge Attorneys

United States Patent Office 3,120,488
Patented Feb. 4, 1964

3,120,488
METHOD OF AND APPARATUS FOR SEPARATING SOLID MATERIALS INTO FRACTIONS ACCORDING TO DENSITY
Petrus J. van der Walt, Johannesburg, Transvaal, Republic of South Africa, assignor to Nortons-Tividale Limited
Filed Mar. 10, 1961, Ser. No. 94,861
Claims priority, application Great Britain Mar. 15, 1960
5 Claims. (Cl. 209—172.5)

This invention relates broadly to methods of and apparatus for separating solid materials into two or more fractions according to density in a dense medium, for example, the float-and-sink separation of coal from shale in an aqueous suspension of magnetite.

The invention is specifically concerned with methods and apparatus in which the dense medium is passed through a vessel containing the dense medium and out over a discharge weir in such quantity that the depth of liquid flowing over the discharge weir is sufficient to carry the float fraction out of the vessel without other mechanical aid. The dense medium must then be recovered, and in practice it is circulated continuously through a closed path, passing through the vessel again and again, inevitable losses being made up as required.

Separators in which there is such circulation of the medium have the advantage of mechanical simplicity. They have the disadvantage, however, that if the rate of circulation of the medium necessary to effect the free discharge of the float fraction greatly exceeds the minimum required to ensure the stability of the medium, power consumption and wear and tear increase with attendant increases in operation and maintenance costs. Furthermore, in extreme cases, the rate of flow of the medium through the vessel may reach a point where the accuracy of the separation of the float and sink fractions according to density may be impaired.

The rate of circulation of the medium is a function of the overflow liquid depth and the width of the overflow weir. The liquid depth is a function of the maximum particle size of the material forming the float fraction, and in practice it is found that the liquid depth of overflow is usually between a half and two-thirds of the controlling dimension of the largest particle, but in some vessels it may be less than a half. The term "particle" is used to include lumps and pieces, such as lumps of coal.

The minimum width of the overflow weir must be enough to enable maximum float fraction to be discharged.

In practice the rate of circulation of the medium necessary to effect the free discharge of the float fraction is almost invariably greater than the minimum required for stability, but when the maximum particle size of the material is small, say 1" or less, and when in consequence the liquid overflow depth is small, the rate of medium circulation may only slightly exceed the minimum required for stability of medium. On the other hand if the particle size is large and the liquid overflow depth is correspondingly great, the rate of medium circulation must very greatly exceed the minimum.

An object of this invention is to effect the separation at low rates of circulation even when relatively large particles are present.

Another object is to provide apparatus having a novel and useful discharge weir.

I have found that I can limit the rate of circulation to that normally required for small material even when the maximum particle size of the material is substantially increased. I do this by discharging part of the float fraction in an overflow liquid depth less than that required for the discharge of large particles contained in it and causing the large particles to travel to an outlet in which they are discharged in greater overflow liquid depth.

I carry out the invention in practice in an apparatus which comprises a circular vessel, means for maintaining the mass in the vessel in rotary motion and an overflow weir greater in height at the end first approached in the direction of rotation of the circulating mass than at the other, so that as the mass moves along the weir smaller particles in the float fraction are first discharged, whereas larger particles pass over a lower part of the weir that allows greater over-flow liquid depth.

The weir way may be stepped, and the stepped parts may or may not be separated by a part of the vessel extending to the upper edge thereof. Alternatively the weir may progressively decrease in height.

One apparatus according to the invention, and some forms the weir may take, will now be described by way of example with reference to the accompanying drawings, in which:

FIGURES 3, 4 and 5 are diagrams on a larger scale showing different forms of weir provided according to the invention.

Figure 1:
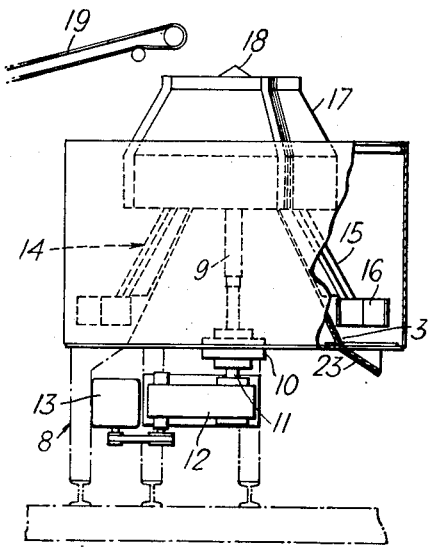
FIGURE 1 is a somewhat diagrammatic elevation of the apparatus.

The apparatus shown is of the kind described in application Serial No. 856,497, filed December 1, 1959, now Patent No. 3,023,903, issued March 6, 1962. Only so much of the apparatus as is required for an understanding of the present invention is shown. Broadly the apparatus shown comprises an annular vessel 1 having a cylindrical outer wall 2 and a frusto-conical inner wall 3. The vessel is carried by a supporting structure indicated generally at 8.

The conical space within the inner wall 3 houses a shaft 9 driven through a coupling 10 by a driving shaft 11, itself driven through a speed reducer 12 by a motor 13. The shaft 9 carries a structure 14 which includes bars 15 carrying paddles 16. The structure also includes a sleeve 17 supported by a central cap 18 on the shaft 9.

In operation the material is fed from a conveyor 19 to the sleeve 17, which acts as a chute. Some of the material falls on the cap 18 and slides down this.

The bottom of the sleeve 17 extends below the level of the surface of the suspension, indicated by the line x—x, and the material is discharged radially from the bottom of the sleeve.

The float fraction is discharged into a launder 21 over a weir 22. The sink fraction is discharged through an outlet 23.

The novelty in the apparatus shown is the form of the weir. As shown in FIGURE 3 this weir may be higher over the greater part of its length 24 than over the remainder 25. As shown in FIGURE 4 higher and lower parts 26 and 27, respectively, may be separated by a part of the wall 2, over which of course no material normally flows. Again as shown in FIGURE 5 a weir 20 may progressively change in height between its two ends. In all these figures the direction of rotation of the rotary structure and therefore of the material in the vessel is indicated by an arrow.

Figure 2:
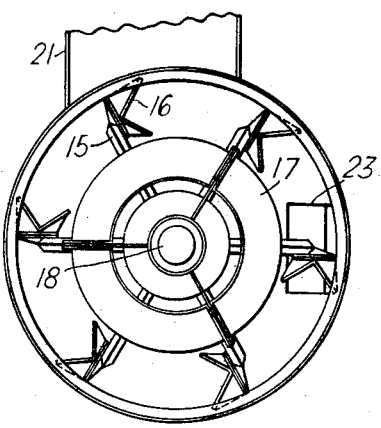
FIGURE 2 is a plan of this apparatus.

As an example, an 8 ft. diameter vessel 1 made as shown in FIGURES 1 and 2 was used to separate raw coal sized 3½" to ¼". A 42" long weir was provided in the outer wall. This weir was of constant height, and it was found possible to obtain a free discharge of floats with a 1½" liquid depth over the weir. This required a medium circulation of approximately 270 gallons per minute.

It was desired to increase the top size of the feed to 7". For this it was established that a liquid depth of 2" to 2¼" would be required. This would have required a circulation of about 450 gallons per minute over the full 42" length. By reducing the height of only the last 10" of the weir by 1 inch, i.e., by making the part 24 in FIGURE 3 1 inch higher than the part 25, I successfully discharged the 7" to ¼" float fraction without increasing the medium circulation from the original 270 gallons per minute. Practically all of the small coal (below 2½" or 3") passed over the higher part 24 of the weir in a liquid depth of about 1" while the remainder was discharged over the lower part 25.

It will be appreciated that there is size segregation of the discharged float fraction resulting from the stepped weir construction. Commonly the float fraction passes on to a screen through the first part of which the circulating medium is, as far as possible, drained and through the second part of which medium particles adhering to the coal are rinsed off with water. In normal practice where there is no size segregation the smaller pieces of coal at the rinsing stage are liable to be "blanketed" by the larger pieces, and medium particles may be left adhering to them. It is a further advantage of the invention that, as a result of size segregation, there is more effective rinsing and therefore reduced loss of medium.

I claim:

1. In an apparatus for use in the float-and sink separation of solid materials into at least two fractions according to density in a dense medium including a circular vessel for the mass of materials and medium and means for moving at least the float fraction in the vessel along a generally horizontal rotary path defined by the inner wall of said circular vessel, the improvement which comprises means for increasing the capacity of said apparatus to accommodate larger size particles in the material fed thereto and maintaining the circulation of separating medium substantially constant comprising a single, relatively short overflow weir formed in said wall adjacent said path, said weir being greater in height at the end thereof first approached in the direction of rotation of the circulating float fraction than at the other end thereof, whereby as the float fraction moves along the weir smaller particles in the float fraction are first discharged, whereas larger particles in said float fraction pass over the lower part of said weir.

2. In an apparatus according to claim 1, wherein said overflow weir is stepped.

3. In an apparatus according to claim 2 wherein the stepped parts of the weir are separated by a part of the vessel extending upwardly above the level of material in said vessel.

4. In an apparatus according to claim 1 in which said weir progressively decreases in height from the upstream end thereof towards the downstream end thereof.

5. In a float-and-sink method of separating solid materials into at least a float fraction and a sink fraction according to density in a dense separating medium and wherein said float fraction contains particles of varying size, comprising moving the float fraction and medium along a general horizontal circular path and bounded by an imperforate substantially cylindrical wall and controlling the rate of overflow of separating medium carrying the float fraction by a single overflow discharge zone in said wall along a relatively small portion of said circular path, the first portion of said discharge zone in the direction of rotation of the float fraction having an overflow liquid depth for small particles which is substantially less than that required for the discharge of larger particles contained in the float fraction, and the last portion of said zone having an overflow liquid depth sufficient to discharge the larger particles of said float fraction.

References Cited in the file of this patent

UNITED STATES PATENTS

| | | |
|---|---|---|
| 2,552,378 | McNeill | May 8, 1951 |
| 2,624,461 | Falconer | Jan. 6, 1953 |
| 2,777,577 | McNeill | Jan. 15, 1957 |
| 2,868,376 | Meisel | Jan. 13, 1959 |